Patented Dec. 29, 1953

2,664,413

UNITED STATES PATENT OFFICE 2,664,413

PREVENTING PREMATURE POLYMERIZATION OF RESINIFIABLE MIXTURES WITH OXALIC ACID

Earl E. Parker, Milwaukee, Wis., assignor to Pittsburgh Plate Glass Company, Allegheny County, Pa., a corporation of Pennsylvania No Drawing. Application June 30, 1951, Serial No. 234,671

11 Claims. (Cl. 260—45.4)

The present invention relates to stabilization of alkyd resinous polyesters of glycols or dihydric alcohols and ethylenically unsaturated dicarboxylic acids, or more particularly to stabilization of copolymerizable mixtures of such polyesters and an ethylenically unsaturated compound which preferably is liquid and soluble in the polyester.

It has heretofore been proposed to prepare polymerizable linear polyesters of dihydric alcohols or glycols such as propylene glycol or diethylene glycol and ethylenically unsaturated dicarboxylic acids such as maleic acid or fumaric acid. These polyesters, when appropriately heated in the presence of a catalyst of addendum reaction such as benzoyl peroxide, tertiary butyl hydroperoxide, or any of the other conventional catalysts of addendum polymerization, tend to set up or harden, possibly by crosslinking of the long chain polyester molecules at points of unsaturation to form hard thermoset resins. The setting up or hardening, it has been found, can be greatly promoted by the inclusion in the polyester of an ethylenically unsaturated compound often called a "monomer." Preferably such compound is liquid and soluble in the polyester. Such compound usually contains the group $>C=CH_2$. Appropriate ethylenic compounds included styrene, alpha methyl styrene, diallyl phthalate, vinyl acetate, divinyl benzene, acrylonitrile, and the like. The copolymerizable mixtures of the polyesters and the vinylically unsaturated compounds are usually liquid and they will spread or flow readily and they tend strongly to gel, even at room temperatures. They will set up when heated in molds, or spread as films, or made up into laminates, even in the absence of substantial pressures to form hard, transparent, thermoset resins of high commercial value.

This tendency of the copolymerizable mixtures to gel or set up even at moderate room temperatures and at low pressures is, in many respects, a very desirable property. However, it presents problems where the copolymerizable mixtures are to be stored for appreciable times before being poured into molds for casting operations, or for laminating, or for other operations to which the resins are adapted. Since it may lead to premature polymerization or gelation of the mixture this problem is greatly accentuated after the incorporation of the catalyst of polymerization such as benzoyl peroxide, tertiary butyl hydroperoxide, or the like. In order to improve the storage characteristics of the copolymerizable mixtures, it has been proposed to incorporate into them various soluble polymerization or gelation inhibitors such as quinone and phenolic compounds of the type of hydroquinone, catechol, tertiary butyl catechol, and the like. Most, if not all, of these compounds disclosed in the prior art tend strongly to inhibit premature gelation. However, they also present problems, because when employed in amounts adequate to inhibit premature gelation, especially of the catalyzed mixtures at room temperature, or slightly above, they often retard the rate of cure of the mixtures when the latter are subjected to normal curing conditions such as increased temperatures or the like.

The prior art of preparing copolymerizable mixtures of ethylenically unsaturated polyesters and vinylic compounds is represented by the following typical patents: 2,308,495 and 2,496,933. The theories of copolymerization are also expounded at some length in such articles as that in Industrial and Engineering Chemistry, December 1939, page 1512, or Industrial and Engineering Chemistry, January 1940, page 64. These patents and articles are only illustrative of the prior art. The art at the present time is very extensively developed and further amplification with respect thereto is believed to be unnecessary.

The present invention provides an improvement upon the previously known polyesters of ethylenically unsaturated dicarboxylic acids or mixtures of such polyesters and vinylically unsaturated monomers or to analogous polyesters and copolymerizable mixtures. According to this invention it has been discovered that free oxalic acid constitutes a highly efficient inhibitor of premature polymerization gelation of mixtures of the polyesters and the vinylically unsaturated monomers. It has now been found that oxalic acid very effectively stabilizes these polyesters even when they contain a peroxide catalyst of copolymerization compounds which function to inhibit pre-mature curing of the catalyzed resinifiable mixtures are termed "tank life extenders." Such discovery is believed to be quite surprising since oxalic acid is only a poor stabilizer against polymerization or gelation during storage. Especially satisfactory results are attained if another inhibitor of gelation which possesses superior storage inhibition properties during normal periods of storage without catalysts is included in the mixture. Any of the usual inhibitors normally added to the uncatalyzed mixtures may be employed, but the phenolic inhibitors such as the dihydric phenols are especially valuable for use in combination with oxalic acid. Even in the presence of catalysts of polymerization such as the conventional peroxide catalysts at room temperature and slightly above, e. g. at 100 or 120° F., it will retard gelation for one or two days. At the same time, after the mixtures are appropriately heated to normal polymerization temperatures, they will set up or polymerize practically as effectively as if no inhibitor were present. Free oxalic acid may be employed as a tank life extender in practically any of the conventional alkyd-like polyesters of glycols and, ethylenically unsaturated dicarboxylic acids or mixtures thereof with vinylically unsaturated compounds known in the voluminous prior art or the equivalents of such prior art materials.

Ethylenically unsaturated compounds, particularly monomers thereof which may be employed in combination with an appropriate polyester, include almost any liquid compounds which are soluble in the polyester and include the active ethylenic ($>C=CH_2$) or vinyl group. Specific examples of such compounds include styrene, alpha methyl styrene, diallyl phthalate, vinyl acetate, divinyl benzene, triethylene glycol diacrylate, diethylene glycol bis allyl carbonate, diallyl benzene phosphonate, methyl acrylate, methyl methacrylate, acrylonitrile, the allyl esters of phosphoric acid, and such other related compounds as are soluble in the polyester component of the mixture. Many examples of such compound are included in the prior art.

The compounds above described or their equivalents can be employed in combination with practically any of the polyester components which contain reactive ethylenic groups in the dicarboxylic acid radical. Many examples of these are disclosed in the prior art such as the patents or articles previously referred to.

In preparing the polyesters, practically any of the conventional dihydric alcohols or glycols may be employed. Representative examples of such glycols are ethylene glycol, diethylene glycol, triethylene glycol, polyethylene glycol, trimethylene glycol or 1,2 propylene glycol, or similar glycols. Glycols containing substituents such as chlorine, methyl or ethyl groups, which in the compound are non-reactive, are not excluded. In general, these glycols are employed in molecular equivalency or in slight excess (e. g. 10 or 20% excess) of the total of the dicarboxylic acids or if monocarboxylic acids are employed, of the complete combination of acids. This excess of the dihydric alcohol or glycol is preferred in order readily to obtain relatively low acid value in the polyester component. In most instances, the ethylenic group in the dicarboxylic acid from which the polyester is derived is alpha-beta with respect to at least one of the carboxyls and preferably it is alpha-beta with respect to both.

Usually the dibasic unsaturated acid includes the group $C=C-C=O$ containing carbon-oxygen conjugation. However, a few dicarboxylic acids including ethylenic groups in non-alpha-beta relation with respect to either of the dicarboxyls are known and these are within the scope of the invention where the resultant polyesters thereof are compatible with the vinylically unsaturated monomers and are capable of polymerization. Endomethylene Δ4 tetrahydrophthalic acid is representative of this latter group.

Examples of dicarboxylic acid or acids suitable for use in preparing the polyesters include as representative members maleic acid, fumaric acid, or the chloro, or methyl, or ethyl substituted maleic, or fumaric acid. Still other unsaturated acids include citraconic acid, mesaconic acid, itaconic acid, and numerous others including the essential structures, namely a $C=C-C=O$ group. Obviously, the term "acid" as employed herein likewise contemplates the anhydrides of these acids (where they exist) since both the acids and the anhydrides react to provide identical polyesters.

Usually the ethylenically unsaturated acids of the types above described, if employed as the only acid component of the polyester, would include more ethylenic groups than are necessary to obtain adequate polymerizability of the resultant polyesters. Polyesters in which a portion of the carboxylic acid is free of functioning groups (other than carboxyls) such as ethylenic groups may therefore be substituted for a part of the ethylenically unsaturated dicarboxylic acid. Maleic acid and fumaric acid or like ethylenically unsaturated dicarboxylic acid such as herein described may be used in conjunction with dicarboxylic acids having no ethylenic unsaturation, phthalic acid, adipic acid, succinic acid, sebacic acid, azelaic acid, or chloro or bromo or methyl or ethyl substituted derivations thereof, and numerous other dicarboxylic acids, in practically any portion up to 10 moles or even 12 moles of the latter type of acid per mole of the ethylenically unsaturated dicarboxylic acid. Often, products containing a portion of non-ethylenically unsaturated acids are of superior flexibility and toughness.

It is likewise within the scope of this invention to stabilize polyesters in which a monocarboxylic acid, preferably of the fatty type, has been substituted for a portion of the dicarboxylic acids. Such acids include butyric acid, lauric acid, stearic acid, oleic acid, linoleic acid, elaeostearic acid, linolenic acid and many others of the fatty group, with or without double bonds designed to impart so-called air drying properties to the resins. Usually, these monocarboxylic acids are employed in lesser proportions than the dicarboxylic acids. Of course, the monocarboxylic acids may be dispensed with entirely, but if they are employed they preferably will be within a range of approximately ½ to ⅙ or even $\tfrac{1}{12}$ mole per mole of the sum of the dicarboxylic acids in the polyester.

The preparation of the polyesters follows conventional techniques familiar to the art of preparing alkyd resins and especially of preparing polyesters of the alkyd type from ethylenically unsaturated dicarboxylic acids and appropriate glycols. Esterification may, for example, be effected by heating the desired acid mixture and the glycol component together in an appropriate kettle, or other container, to a temperature around 150° or 200° C. and preferably under a blanket of an inert gas such as carbon dioxide until water of reaction has been evolved and removed and the acid value has been reduced to a reasonable figure, for example 10 to 50. Heating should be halted before the decomposition is initiated and the ester product reaches the stage of insolubility.

The resultant polyesters are usually quite viscous or even of solid nature, but they are still fusible and are usually soluble in xylene, toluene, and often in drying oils or the like. They are soluble in or compatible with the vinylic compound with which they are to be combined.

Specific examples of polyesters which may be admixed with vinylic or ethylenic compounds as above described for tank life stabilization in accordance with the provisions of the present invention include:

Propylene maleate.
Propylene fumarate.
Propylene itaconate.
Diethylene maleate.
Diethylene fumarate.
Diethylene itaconate.
Mixed polyesters of glycols and mixtures of ethylenically unsaturated dicarboxylic acids and dicarboxylic acids free of reactive unsaturation. These include:

Propylene maleate phthalate.
Diethylene maleate phthalate.
Propylene sebacate maleate.
Propylene adipate maleate.
Diethylene adipate maleate.
Propylene adipate fumarate.
Diethylene adipate fumarate.

The ethylenically unsaturated dicarboxylic acids and the dicarboxylic acid free of ethylenic unsaturation may be employed in approximately equimolar proportions with respect to each other, or they may be varied in the manner already described.

It is convenient to add the oxalic acid to the polyester while the latter is hot, e. g. at a temperature of about 135° C. or such other temperature as will effect solution of the acid in the mixture. The range of oxalic acid may be any inhibiting amount, usually ranging from 0.01 to 5% by weight based upon the polyester. Very satisfactory results have been attained by use of 0.03% by weight likewise based upon the polyester.

The polyester components herein disclosed, per se, are usually very viscous or even solid materials. In commercial practice, it is desirable to heat the polyester substantially, for example to 100 or 120° C. in order to soften it or melt it before the incorporation of the vinylic compound. Naturally, fluidity could be attained by dissolving the polyester preliminarily in an appropriate solvent before the addition of the compound. However if the vinylic compound or monomer is of substantial volatility, the removal of such solvent after addition of the compound or monomer might present problems.

Naturally some polyesters are higher melting than others and should, therefore, be heated to a higher temperature.

Where the vinylic compound is to be incorporated into a hot polyester, it is preferable that addition of the compound be effected in the presence of a suitable gelation or polymerization inhibitor in order to prevent premature copolymerization of the mixture. As previously explained, oxalic acid is most effective in inhibiting premature gelation or polymerization of polyesters containing peroxide polymerization catalysts. Where storage of the uncatalyzed polyester is desirable, it is advantageous to incorporate small stabilizing amounts of other stabilizers, such as quinone, hydroquinone, tertiary butyl catechol, or any of the other stabilizers, which, when employed in amounts adequately to stabilize the catalyzed mixtures against premature polymerization, may adversely affect the final cure, or the product. These may be dissolved in either the polyester component or the vinylic compound component before the copolymerizable mixture is made up. These compounds effectively inhibit the polymerization or gelation of the mixtures during storage, in the absence of catalysts. However, as previously indicated, many of them can not be employed in amounts adequately to stabilize the catalyzed mixtures without unduly retarding the ultimate cure. Hence, it is desirable to include oxalic acid in the mixture. The latter is less effective as a storage catalyst, but is highly effective as a tank life extender.

While for most purposes it is desirable to include an inhibitor designed to promote the storage life of the mixture along with the oxalic acid, it is also contemplated that where the mixtures are to be used promptly after they are made up, the storage inhibitor can be omitted or at least can be employed in minimal amounts such as may be required to stabilize the mixture while it is being made up. Normally the storage gelation stabilizer will be employed in an amount of about 0.001 to 2% by weight based upon the polyester component of the copolymerizable mixture.

The proportioning of the vinylic component and the polyester component to provide copolymerizable mixtures adapted to be stabilized under the provisions of the present invention follows conventional technique, as described in the references already alluded to. Assuming a mixture comprising 50 parts by weight of the ethylenic compound such as styrene or any of the others herein discussed, the proportion of the polyester may be within a range of approximately 25 to 250 parts or more by weight.

An appropriate catalyst of addendum polymerization, e. g. an organic peroxide such as benzoyl peroxide, tertiary butyl hydroperoxide, lauroyl peroxide, or the like may be added at a suitable time before the mixture is to be cured. Naturally, the mixture can be cured at once, after the catalyst is added, but often it is desirable to keep it a day or two, thus avoiding the necessity of making up batches at more frequent intervals. The presence of oxalic acid as a tank life extender in small amount permits the catalyzed mixture to be so kept. The catalyst may be in a proportion of approximately 0.01 up to 5% by weight with respect to the copolymerizable mixture. The catalysts may be added to the polymerizable mixture at room temperature or thereabouts. Copolymerizable mixtures containing oxalic acid are stable for substantial periods, e. g., one or two days or longer, even after the addition of the polymerization catalyst and at temperatures, for example up to about 120° F.

The polymerizable mixtures containing catalysts of polymerization and oxalic acid may be cast in conventional manner in molds of rubber or of rigid material or they may be employed in making up laminates in which they constitute bonding agents for plies of fabric such as fabrics of glass fibers or the like.

The following constitutes specific examples of polyesters which may be employed in the preparation of copolymerizable mixtures. These polyesters are prepared by heating the components at conventional esterification temperature until products of advanced esterification have been obtained.

Alkyd W

| | Moles |
|---|---|
| Maleic anhydride | 2 |
| Propylene glycol | 2.2 |

Alkyd X

| | |
|---|---|
| Phthalic anhydride | 1 |
| Maleic anhydride | 1 |
| Propylene glycol | 2.2 |

Alkyd Y

| | |
|---|---|
| Adipic acid | 4 |
| Maleic acid | 1 |
| Diethylene glycol | 5.2 |

Alkyd Z

| | |
|---|---|
| Phthalic acid | 6 |
| Maleic acid | 1 |
| Diethylene glycol | 7.2 |

In formulas W, X, Y, and Z, the dihydric alcohol is employed in slight molar excess with respect to the sum of the acids. The excess is not critical, the values given being good average working values. The alkyds W, X, Y, and may be mixed in proportions to attain any desired properties. Triethylene glycol can be substituted for the dihydric alcohols in the formulas W, X, Y, and Z. Fumaric acid, itaconic acid, and the like can also be substituted for maleic acid and azelaic and sebacic acid or the like saturated open chain dicarboxylic acids can be substituted for adipic or phthalic acid. Usually, the acid values of the alkyd bodies will be below 50 and preferably in a range of about 10 to 30. Esterification should not be carried so far as to produce an insoluble gel. The polyester molecules are long chains, i. e., several molecules of the dihydric alcohol and the dicarboxylic acid are combined in one molecule.

A conventional inhibitor of polymerization or gelation is usually added thereto while it is fairly hot and fluid, e. g., at 150° C. or else it is added along with or dissolved in the compound.

The oxalic acid, was previously stated, may also be added to this polyester while it is warm, e. g., at a temperature of about 135° C.

The vinylic compounds should be added to these alkyd bodies while the latter are fairly hot, e. g., at a temperature of 120° C. or thereabouts in order to attain adequate fluidity.

Appropriate ranges of the several components of the copolymerizable mixture may be tabulated as follows:

| | |
|---|---|
| Polyester | 50 parts. |
| Ethylenic compound | 0.0 to 250 parts, but preferably 25 to 250 parts. |
| Catalyst (peroxide) | 0.01 to 5% of the total. |
| Gelation or polymerization inhibitor | 0 to 2% and preferably 0.01 to 1% based upon the polyester. |
| Oxalic acid | 0.01 to 5% based upon the polyester. |

Parts and percentages as given in the above table are by weight.

The following constitute typical formulations in which oxalic acid is employed as a tank life extender. These catalyzed mixtures containing free oxalic acid are stable for considerable periods, e. g., for one or two days or even more. The mixtures can be cast or employed as bonding agents in laminating operations and similar operations.

EXAMPLE I

| | |
|---|---|
| Alkyd X | 600 parts by weight. |
| Styrene | 300 parts by weight. |
| Hydroquinone | 0.09 parts by weight. |
| Oxalic acid | 0.01 to 5% by weight, based upon the polyester. |
| Peroxide catalyst | In conventional amount for styrene-alkyd mixes, e. g., 0.01 to 5% by weight. |

A convenient peroxide catalyst mix for use in the formulation may comprise 50% by weight of benzoyl peroxide in tricresyl phosphate. One such mixture is sold under the name "Luperco A. T. C."

The mixture has good "tank life." It may be poured in appropriate molds and heated at atmospheric pressure or thereabouts in order to effect cure. Preferable curing range is about 90 to 150° C. The mixture may also be applied as a coating or impregnating medium to webs of cloth or paper and cured by application of hot rollers or by radiant heat. A similar mixture without oxalic acid gels substantially more quickly. In many instances the mixtures contain a peroxide catalyst and no oxalic acid will gel prematurely.

EXAMPLE II

| | |
|---|---|
| Alkyd X | 55 parts. |
| Styrene | 45 parts. |
| Oxalic acid | 0.3 to 5% by weight. |
| Hydroquinone or other inhibitor | 0.025 parts by weight |
| Peroxide catalyst such as tertiary butyl hydroperoxide | 0.01 to 5%. |

The mixture is stable against gelation for considerable time. The mixture can be employed in casting and laminating operations and can be cured by heating to a moderate temperature, e. g., 90 to 150° C. for 2 to 30 minutes or thereabouts to provide a hard, durable resinous material in the form of castings or as sheets or films.

EXAMPLE III

| | |
|---|---|
| Alkyd Y | 500 parts by weight. |
| Styrene | 500 parts by weight. |
| Para-tertiary butyl catechol | 0.075 parts by weight. |
| Oxalic acid | 0.4% by weight. |
| Luperco A. T. C | 2% by weight. |

The mixture is a liquid and is stable against premature polymerization for considerable periods at room temperature but can readily be cured at moderate temperatures, e. g., 90 to 150° C. in a matter of 2 to 30 minutes, to a flexible, durable, resinous material.

EXAMPLE IV

In tests to determine the storage, tank life, and curing characteristics of the copolymerizable mixtures, samples were made up as follows:

SAMPLE A

This sample comprised:

| | Parts by weight |
|---|---|
| Alkyd X | 600 |
| Styrene | 300 |
| Hydroquinone | 0.09 |

This mixture constituted a control in which oxalic acid was not used.

SAMPLE B

This sample comprised:

| | Parts by weight |
|---|---|
| Alkyd X | 600 |
| Styrene | 300 |
| Hydroquinone | 0.09 |
| Oxalic acid | 0.18 |

This sample contained oxalic acid as a tank life extender.

SAMPLE C

| | Parts by weight |
|---|---|
| Alkyd Y | 500 |
| Styrene | 500 |
| Para-tertiary butyl catechol | 0.075 |

This was a control sample.

SAMPLE D

| | Parts by weight |
|---|---|
| Alkyd Y | 500 |
| Styrene | 500 |
| Para-tertiary butyl catechol | 0.075 |
| Oxalic acid | 0.25 |

This mixture contained para-tertiary catechol as a storage inhibitor and oxalic acid as a tank life extender.

These samples were subjected to tests as follows:

They were admixed with benzoyl peroxide and stored at 100° F. until gelation had taken place to such extent as to form a solid body.

To test the rate of cure of the mixtures the L. P. E. values were determined. These values are the number of minutes required for the catalyzed mixture to reach its peak temperature by exothermal reaction after it has attained a temperature of 150° F.

In the L. P. E. tests, the samples were placed in test tubes and inserted in a water bath at 180° F. The rise of temperature was recorded and the time interval required to pass from 150° F. to maximum temperature or peak exotherm was recorded in minutes. This is termed the L. P. E. value. This constituted a measure of the rate of cure. When the peak had been attained the resin had set to a solid body. A small L. P. E. value indicated a rapid rate of cure. Tank life and L. P. E. tests were conducted with 1.0% by weight and with 1.5% by weight of benzoyl peroxide as a catalyst. The results are tabulated as follows:

| Sample No. | A | B | C | D |
|---|---|---|---|---|
| Name of test: | | | | |
| L. P. E., 1.0% B. P.[1], mins | 6.3 | 5.8 | | |
| L. P. E., 1.5% B. P., mins | 4.5 | 4.4 | | |
| Tank life, 1.0% B. P., hrs. at 100° F | 43 | 57 | 12 | 24 |
| Tank life, 1.5% B. P., hrs. at 100° F | 25 | 41 | 12 | 15 |

[1] B. P. designates benzoyl peroxide.

It will be noted that the addition of oxalic acid quite materially increases the "tank life" of the samples. In some instances, the rate of cure of the samples seemed to have been enhanced by the oxalic acid.

Application of the invention upon a commercial scale is illustrated as follows:

EXAMPLE V

Prepare a polyester of propylene glycol and a mixture of maleic acid and phthalic acid, said acids being respectively in the molar ratios of 9 and 11. Admix the polyester with styrene and a small amount of 3-isopropyl catechol in the following proportions:

| | | |
|---|---|---|
| Polyester | lbs | 6,115 |
| Styrene | lbs | 2,250 |
| 3-isopropyl catechol | grams | 405 |

This material when admixed with 1% by weight of benzoyl peroxide at 100° F., has a tank life of 23 hours and an L. P. E. value, determined as previously described, of 5.2 minutes.

A substantially identical commercial batch of the composition:

| | | |
|---|---|---|
| Polyester | lbs | 6,121 |
| Styrene | lbs | 2,280 |
| 3-isopropyl catechol | grams | 405 |
| Oxalic acid | do | 840 | with 1% by weight of benzoyl peroxide at 100° F. has a tank life of 44 hours and an L. P. E. value of 5.2 minutes. The tank life is almost doubled without decreasing the rate of cure.

It may be stated that 3-isopropyl catechol is inherently of exceptional merit as an inhibitor of gelation or polymerization in that its effect upon the rate of cure of the mixture is exceptionally slight. At the same time, it produces storage stability and extends the tank life of the mixture. It is surprising that the oxalic acid enhances the properties of this excellent inhibitor.

The mixtures of the second formulation in this example can be poured into molds, admixed with fillers, applied as coatings or employed to impregnate fabrics. The mixtures can be cured by heating in conventional manner or by irradiation with actinic rays.

In this application, the proportions stated are to be considered as being by weight unless otherwise specified.

The specific embodiments of the invention herein disclosed are to be considered as being by way of example. It will be apparent to those skilled in the art that numerous modifications may be made therein without departure from the spirit of the invention or the scope of the appended claims.

I claim:

1. As a new composition of matter a polymerizable polyester of a dihydric alcohol and an alpha-beta ethylenically unsaturated dicarboxylic acid, said polyester containing free oxalic acid in an amount to inhibit polymerization upon the incorporation of a peroxide catalyst of polymerization.

2. As a new composition of matter a polymerizable polyester of a dihydric alcohol and an ethylenically unsaturated alpha-beta dicarboxylic acid, said polyester containing a peroxide catalyst of polymerization in an amount to catalyze curing of the polyester and a small polymerization inhibiting amount of free oxalic acid.

3. A copolymerizable mixture of a liquid ethylenic compound containing the group $>C=CH_2$ and a polyester of a dihydric alcohol and an alpha-beta ethylenically unsaturated dicarboxylic acid, said polyester being compatible with the ethylenic compound, said composition containing a peroxide catalyst of copolymerization in catalytic amount and a small polymerization inhibiting amount of free oxalic acid.

4. As a new composition of matter, a copolymerizable mixture of (A) a polyester of a glycol and a dicarboxylic alpha-beta ethylenically unsaturated acid, (B) an ethylenic compound soluble in the polyester, (C) a peroxide catalyst of polymerization in catalytic amount, and (D) free oxalic acid in an amount to inhibit premature gelation during storage before the mixture is cured.

5. As a new composition of matter a copolymerizable mixture of (A) a polyester of a glycol and a dicarboxylic alpha-beta ethylenically unsaturated dicarboxylic acid, (B) a vinylic compound soluble in the polyester, (C) a phenolic gelation inhibitor in a small effective amount, and (D) free oxalic acid in amount to impart a storage life, after addition of peroxide catalyst of polymerization, of approximately one day and upward.

6. A copolymerizable mixture as defined in claim 3 in which the polyester includes as a component a dicarboxylic acid which is free of ethylenic unsaturation.

7. In a method of forming a resinous body, the steps of preforming a polyester of a glycol and an alpha-beta ethylenically unsaturated dicarboxylic acid, dissolving free oxalic acid in said preformed ester and dissolving a vinylic compound containing a >C=CH₂ group in the polyester and subsequently adding an effective amount of a peroxide catalyst of polymerization to the mixture, the oxalic acid being added in an amount substantially to prevent premature gelation of the mixture after the addition of the catalyst.

8. The steps as defined in claim 7 in which a phenolic inhibitor of gelation is incorporated in the copolymerizable mixture along with the oxalic acid.

9. In a method of forming a resinifiable mixture, the steps of adding to a polymerizable polyester of a mixture of a dihydric alcohol and a dicarboxylic acid which is alpha-beta ethylenically unsaturated, a vinylic compound containing the terminal group >C=CH₂ in the presence of a polymerization inhibitor and then adding to the mixture free oxalic acid in amount to stabilize the mixture against premature gelation for a substantial period after peroxide curing catalysts are added.

10. The composition of claim 3 wherein the ethylenic compound is styrene.

11. In a method of forming a resinifiable mixture, the steps adding to a polymerizable polyester of a mixture of a dihydric alcohol and two dicarboxylic acids, one of which is alpha beta ethylenically unsaturated and the other of which is free of ethylenic unsaturation, a vinylic compound containing the terminal group >C=CH₂, in the presence of a polymerization inhibitor and then adding to the mixture free oxalic acid in amount to stabilize the mixture against premature gelation for a substantial period after peroxide curing catalysts are added.

EARL E. PARKER.

References Cited in the file of this patent

UNITED STATES PATENTS

| Number | Name | Date |
|---|---|---|
| 2,439,677 | Shapiro | Apr. 13, 1948 |